Patented Mar. 5, 1946

2,395,957

UNITED STATES PATENT OFFICE 2,395,957

PROCESS FOR CONCENTRATING UNSATURATED HYDROCARBON MATERIAL

Frederick W. Breuer, Haverford, Pa., assignor to The United Gas Improvement Company, a corporation of Pennsylvania No Drawing. Application July 24, 1942,
Serial No. 452,260

13 Claims. (Cl. 260—681.5)

This invention pertains generally to the recovery of unsaturated hydrocarbons from mixed gases containing the same and pertains particularly to such operations wherein salts of metals of groups 1 and 2 of the periodic system are employed.

I have found that when solid dry salts of the character described (that is, salts substantially free from water) are employed for this purpose and whether or not the mixture containing the unsaturated hydrocarbons is in the liquid or vapor phase, there is a distinct tendency for polymerization and other side reactions to take place resulting not only in a loss of unsaturated hydrocarbon material but frequently also in deposits upon the particles of solid dry reagent. Such deposits not only reduce the activity of the reagent particles but also greatly increase the tendency for the particles to coalesce with a further reduction in activity and a substantial increase in operating difficulties.

I have discovered that side reactions of the character described as well as the deposition of reaction products upon the reagent particles may be very substantially reduced or prevented by mixing with the solid dry reagent or with the mixture to be, or undergoing, treatment, an organic base.

Solid dry salts of metals of groups 1 and 2 of the periodic system and particularly monovalent salts of heavy metals of these groups, such as halides, nitrates, sulfates, phosphates, formates, acetates, propionates, carbonates and lactates of copper, mercury and silver may be employed for the removal or recovery from hydrocarbon mixtures, either in the vapor or liquid phase, of diolefines and/or olefines by the formation of an association product of one or more of said unsaturated hydrocarbons with one or more of said salts under suitable temperature and pressure conditions, which association product may be afterward dissociated such as by an elevation in temperature and/or reduction in pressure, usually after separation from the unreacted material, to regenerate the unsaturated hydrocarbon or hydrocarbons and the reagent salt.

For reaction efficiency and ease of handling, it is very desirable to maintain the solid dry reagent in finely divided form during the treatment and with surfaces uncoated with secondary reaction products.

Furthermore, that portion of the reagent which becomes coated with secondary reaction products represents a loss in reagent itself. When present in considerable quantity, it may reduce the activity of the reagent to such an extent as to require a complete renewal thereof with fresh material.

By the operation of my invention the useful life of the reagent is greatly extended and the loss of unsaturated hydrocarbons by virtue of side reactions is greatly reduced.

Under suitable conditions of temperature and pressure, diolefines may be made to selectively react with reagents of the type described in preference to olefines.

Furthermore, any two or more of these classes of hydrocarbons may be caused to react with a mass of reagent salt to form a plurality of association products which, since they have different dissociation pressures, may be dissociated selectively, such as stagewise, to yield each class of hydrocarbon in more concentrated form.

Moreover, any of these classes of unsaturated hydrocarbons may be selectively removed from mixtures containing other materials.

In some instances, the tendency to form solid or semi-solid secondary reaction products by polymerization or otherwise is very pronounced and when the reagent is in a solid dry form such secondary reaction products are deposited upon the reagent particles. Such deposits not only prevent the mixture undergoing treatment from coming into proper contact with reagent particles thus coated but also tend to cause the reagent particles to agglomerate to introduce processing and handling difficulties.

While any organic base may be mixed with the reagent salt, I prefer to select such organic basic materials which are either inert with respect to the reagent salt or of very low reactivity therewith.

I also prefer to employ organic basic substances of relatively low volatility in order that they may be retained over a longer period in admixture with the reagent salt without necessity of unduly large make-up, and without undue admixture of volatilized basic material with recovered unsaturated hydrocarbons.

In the event that any organic basic material reacts to an appreciable extent with the salts, it is preferred that such reaction product be of low vapor pressure.

It is also preferred that any salts which may be formed between the organic base and any acidic material which might be present during the various stages of the process be readily soluble in an ordinary solvent so that, if desired, it may be readily removed from the reagent salt.

In addition, if desired, the organic base may be chosen so that any salt formed therewith may have little tendency to hydrolyze in the presence of moisture, the presence of which is substantially unavoidable in industrial operations of the character under discussion.

Examples of organic basic materials which may be used in my invention are as follows:

A. Primary, secondary and tertiary alkyl amines such as methyl amine, dimethyl amine, trimethyl amine, ethyl amine, diethyl amine, triethyl amine, propyl amine, butyl amine, amyl amine, etc.

B. Primary, secondary and tertiary hydroxy alkyl amines, such as monoethanolamine, diethanolamine and triethanolamine.

C. Aromatic amines such as aniline (phenyl amine), ortho toluidine, meta toluidine, para toluidine, benzylamine, methyl aniline, dimethyl aniline, diethyl aniline, benzyl aniline, acetanilide, aceto-acetanilide, 1,2,3-xylidine, 1,2,4-xylidine, 1,3,2-xylidine, 1,3,4-xylidine, 1,3,5-xylidine, 1,4,2-xylidine, and aryl amines in general.

D. Alkyl and aryl hydroxyl amines such as beta phenyl hydroxyl amine, alpha methyl hydroxyl amine and beta methyl hydroxyl amine.

E. Aliphatic and aromatic quaternary ammonium bases such as alkyl and aryl ammonium hydroxides, for example, tetramethyl ammonium hydroxide, phenyl trimethyl ammonium hydroxide, benzyl trimethyl ammonium hydroxide, etc.

F. Alkyl and aryl hydrazines, such as primary hydrazines, for example, methyl hydrazine and ethyl hydrazine; unsymmetrical dialkyl hydrazines, for example, unsymmetrical dimethyl hydrazine and unsymmetrical diethyl hydrazine; phenyl hydrazine and methyl phenyl hydrazine. Many of these compounds have the added advantage of being powerful reducing agents, thus tending to insure the presence of reagent salt in monovalent form.

G. Amine oxides such as trimethyl amine oxide.

H. Cyclic tertiary bases such as pyridine, quinoline, isoquinoline, acridine, alpha, beta and gamma picoline, dimethyl pyridines, trimethyl pyridines, hydrogenated pyridines, for example, piperidine.

Any desired or suitable quantity of organic basic material may be employed.

However, it is preferred that the reagent salt shall not be suspended or floated in a continuous liquid phase of organic basic material, for example, to form a slurry.

The solid reagent salt per se may be said to be dispersed since it is employed in a disintegrated form, for example, in the form of a powder to form a mass with considerable free space between the particles thereof.

When the reagent salt is mixed with an organic basic liquid it is preferred to retain a substantial part of this free space. Accordingly, the proportion of organic basic liquid to solid salt preferably should not be sufficient to form a continuous liquid phase with solid salt particles dispersed therein, but should be restricted to such quantity that the liquid itself may be said to be dispersed along with the solid, in which condition there may be said to be retained in the mass a degree of free space between the wetted particles thereof.

Thus the reagent when thus treated with the liquid differs from a slurry in that it is not freely flowing or pumpable as is the case with a slurry.

As a rule between 0.1% to 10% by weight of organic basic material to solid reagent salt will give improved results, the exact amount required for optimum conditions depending somewhat upon the degree of moisture present in the hydrocarbon mixture to be treated. The use of 5% or less, of organic basic material will be found to give excellent results in practically all cases.

Since such hydrocarbon mixtures are usually for the most part substantially dry and usually contain hardly more than traces of moisture, 2% by weight of organic basic substance based upon solid dry reagent salt present will usually be very satisfactory.

Processes of the general character to which my invention may be applied relate for the most part to the selective recovery of unsaturated hydrocarbons of less than seven carbon atoms from mixtures thereof, although they are not limited thereto.

Frequently, it is found to be technically advantageous to first resort to fractional distillation or other means to narrow the boiling range of the mixture.

Thus a $C^5$ cut may be treated to separate diolefines from olefines or a distillate fraction containing substantially no other diolefine but, say, isoprene or piperylene may be treated to segregate the respective diolefine from olefinic and any paraffinic material which might be present.

Likewise, a $C_4$ cut containing butadiene, butene and perhaps butane may be treated to segregate the butadiene in high concentration.

A $C_3$ cut or a $C_2$ cut might be treated to segregate propylene or ethylene respectively in high concentration.

The diolefines present in a given fraction may be contacted under conditions of temperature and pressure such that substantially only diolefine materials are absorbed by the reaction mass. Then after removal of unreacted material the complex formed between the diolefine material and the reaction mass may be decomposed by elevation in temperature and/or reduction in pressure to revivify the reaction mass and to regenerate the diolefine material.

On the other hand, both olefines and diolefines may be absorbed at the same time and separated from each other by regulation of temperature and/or pressure during dissociation as already referred to.

The recovery of $C_5$ diolefine material from a mixture thereof containing other hydrocarbons by contacting the same with a solid dry salt of a heavy metal of groups 1 and 2 of the periodic system, is described in my copending application, Serial Number 345,101, filed July 12, 1940, which has matured into Patent 2,359,020, granted September 26, 1944, and the recovery of butadiene from a mixture thereof containing other hydrocarbons by contacting the same with solid dry cuprous chloride is described in Chemical Abstracts, vol. 32, 6098–6100 (1938).

The recovery of olefines from hydrocarbon mixtures containing the same by contacting said mixtures with solid dry salts of the character referred to herein is described in U. S. Patent 2,116,157, dated May 3, 1938, and U. S. Patent 2,209,452, dated July 30, 1940.

My invention may be applied in any of the foregoing processes with the advantages set forth herein.

If desired, any one or more organic basic materials may be applied to the solid salt prior to contact with the material to be treated in the form of a solution or suspension in a basic or non-basic liquid, if desired, care preferably being taken that any liquid in the reaction mass when ready for use is substantially non-aqueous and is in the dispersed phase as distinguished from the continuous phase.

It is understood, of course, that in a large mass of treated reagent salt a portion may contain liquid in the continuous phase.

The following examples will serve to illustrate the invention.

Example I

In a mixing vessel equipped with heating and cooling means and connected to a receiver and pressure reducing device, 2400 grams of dry cuprous chloride powder was treated for one hour with a solution of 26 grams of mixed triamyl amines in 500 cc. of butane. The butane was then distilled off.

150 grams of a 74% isoprene fraction was then mixed with the reagent salt and permitted to react therewith for approximately one hour at a temperature between approximately 15 to 20° C. The unabsorbed hydrocarbon material was then removed from the system by reducing the pressure to between 200 and 600 mm. of mercury while maintaining the temperature at approximately 15° C.

After the removal of the unabsorbed material an intermediate fraction was obtained by further reducing the pressure to 40 mm. of mercury.

Then upon maintaining approximately the latter pressure, the temperature was raised slowly to approximately 60° C. to obtain a 92% yield of the isoprene present in the original fraction in a concentration of 98.5%.

A very thorough examination of the reagent mass showed the absence of any deposits thereon from the material undergoing treatment.

Example II

A 70% light oil piperylene fraction, containing 24% amylenes and 6% pentanes, was concentrated according to the method outlined in Example I, a mixture comprising 98 parts of dry, powdered cuprous chloride and 2 parts of triethanolamine being employed as the concentrating agent.

An 85% yield of the piperylene present in the original fraction, in the form of a product containing 98% piperylene, was obtained.

Example III

A 50% light oil butadiene fraction, containing 48% butylenes and 2% butanes, was treated with an absorbent comprising 98 parts of finely divided cuprous chloride and triethanolamine for a period of one hour at a temperature of −10° C., after which the butylenes and butanes present were largely removed by reducing the pressure on the system and simultaneously raising the temperature to 25° C.

Upon increasing the temperature slowly to 60° C., a small quantity of an intermediate fraction containing 50% butadiene was obtained. Further heating at a temperature above 60° C. resulted in the isolation of 80% of the butadiene present in the original fraction in the form of a 98% product.

I find that in the practice of my invention as the number of cycles of operation increases some polymer accumulates. This polymer is of a character different from that formed when my invention is not employed in that it does not interfere markedly with the efficiency of the solid salt.

Furthermore, as the quantity of polymer increases its rate of formation decreases. For example, during the first few cycles of operation polymer may be formed at the rate of approximately ½% per cycle based on solid salt. This rate decreases as the number of cycles increases so that when the number of cycles reaches say 100, the rate of formation of polymer is found to have dropped to $\frac{1}{10}$ to $\frac{1}{100}$% per cycle.

In each of the foregoing examples, the elimination of the organic basic substance from the absorbent resulted in a substantial deposition of insoluble polymer in the cuprous chloride absorbent. The rate of deposition was so rapid in each case as to render the further use of the absorbent impracticable after only a very few cycles of operation.

As indicated previously, one or more organic basic substances may be employed for my purpose. If desired, such substance or substances may be added directly to the material to be, or undergoing, treatment in view of its or their considerable solubility therein. However, prior treatment of the reagent salt or salts with such substance or substances is particularly advantageous and is preferred.

A number of solid, dry salts of groups 1 and 2 of the periodic system may be employed together for concentrating olefines, and particularly diolefines, the monovalent salts being preferred. Excellent results may be obtained by the use of one or more monovalent salts of silver, copper, or mercury.

An outstanding feature of my process is that it is carried out in a substantially non-aqueous system, or in other words in the substantial absence of water. Since in industrial processes of this general character the presence of some moisture is unavoidable, such moisture should not be permitted to accumulate in quantities greater than 2% by weight of solid dry salt and preferably not greater than 1% by weight of said salt. Substantially lower tolerances are recommended.

While various procedures have been particularly described, these are of course subject to considerable variation. Therefore, it will be understood that the foregoing specific examples are given by way of illustration, and that changes, omissions, additions, substitutions, and/or modifications might be made within the scope of the claims without departing from the spirit of the invention.

I claim:

1. A process for concentrating a light oil diolefine fraction containing olefine material comprising contacting the same with powdered cuprous chloride containing not more than 5% by weight of an organic amine and in the absence of more than 1% by weight of water based on said cuprous chloride, said contact taking place under conditions of temperature and pressure such as to form a diolefine-cuprous chloride association product, and thereafter heating in a stepwise manner to produce a concentrated olefine fraction and a concentrated diolefine fraction.

2. A process for concentrating a light oil butadiene fraction containing butylene comprising contacting the same with powdered cuprous chloride containing not more than 5% of an organic amine and in the absence of more than 1% by weight of water based on said cuprous chloride, said contact taking place under conditions of temperature and pressure such as to form a butadiene-cuprous chloride association product, and thereafter heating in a stepwise manner to produce a concentrated butylene fraction and a concentrated butadiene fraction.

3. A process for concentrating a light oil isoprene fraction containing amylene comprising contacting the same with powdered cuprous chloride containing not more than 5% of an organic amine and in the absence of more than 1% by weight of water based on said cuprous chloride, said contact taking place under conditions of temperature and pressure such as to form an isoprene-cuprous chloride association product, and thereafter heating in a stepwise manner to produce a concentrated amylene fraction and a concentrated isoprene fraction.

4. A process for concentrating a light oil piperylene fraction containing amylene comprising contacting the same with powdered cuprous chloride containing not more than 5% of an organic amine and in the absence of more than 1% by weight of water based on said cuprous chloride, said contact taking place under conditions of temperature and pressure such as to form a piperylene-cuprous chloride association product, and thereafter heating in a stepwise manner to produce a concentrated amylene fraction and a concentrated piperylene fraction.

5. A process for concentrating a light oil butadiene fraction containing butylene comprising contacting said fraction with powdered cuprous chloride admixed with a hydroxy alkyl amine in proportion of not more than 5% by weight of said cuprous chloride, said contact taking place in the absence of more than 1% by weight of water based on said cuprous chloride and under conditions of temperature and pressure such as to form a butadiene-cuprous chloride association product, and thereafter heating the reaction mass in a stepwise manner to produce a concentrated butylene fraction and a concentrated butadiene fraction.

6. A process for concentrating an unsaturated hydrocarbon selected from the group consisting of olefines and diolefines which comprises contacting a fluid hydrocarbon mixture containing said unsaturated hydrocarbon to be separated and hydrocarbon material of lesser unsaturation than said unsaturated hydrocarbon to be separated with a solid powdered monovalent salt of a metal selected from the group consisting of copper, silver, and mercury, said contact being effected in the absence of more than 2% by weight of water and in the presence of 0.1% to 10% by weight of said salt of an organic base and under conditions of temperature and pressure such as to form an association product between said unsaturated hydrocarbon to be separated and said salt, removing hydrocarbon material of lesser unsaturation from the reaction mass, and thereafter decomposing said association product to obtain said unsaturated hydrocarbon in more concentrated form.

7. A process for concentrating a light oil diolefine fraction containing olefine material which comprises contacting said fraction with a reagent containing a solid powdered monovalent salt of a metal selected from the group consisting of copper, silver, and mercury, and containing not more than 5% by weight of an organic base, said contact taking place in the absence of more than 1% by weight of water based on said solid salt and under conditions of temperature and pressure such as to form an association product between diolefine material contained in said fraction and said salt, removing olefine material from said association product, and thereafter decomposing said association product by the application of heat to produce a concentrated diolefine fraction.

8. A process for concentrating a light oil diolefine fraction containing olefinic material which comprises contacting said fraction with powdered cuprous chloride admixed with triamyl amine in proportion of not more than 5% by weight of said cuprous chloride, said contact taking place in the absence of more than 1% by weight of water based on said cuprous chloride and under conditions of temperature and pressure such as to form an association product between diolefine material contained in said fraction and said cuprous chloride, removing olefinic material from said association product, and thereafter decomposing said association product by the application of heat to produce a concentrated diolefine fraction.

9. A process for concentrating a light oil diolefine fraction containing olefinic material which comprises contacting said fraction with powdered cuprous chloride admixed with triethanolamine in proportion of not more than 5% by weight of said cuprous chloride, said contact taking place in the absence of more than 1% by weight of water based on said cuprous chloride and under conditions of temperature and pressure such as to form an association product between diolefine material contained in said fraction and said cuprous chloride, removing olefinic material from said association product, and thereafter decomposing said association product by the application of heat to produce a concentrated diolefine fraction.

10. A process for separating diolefine material in more concentrated form from a fluid hydrocarbon mixture containing said diolefine material and olefine material, which comprises contacting said mixture with a reagent comprising a finely divided intermixture of a solid powdered monovalent salt of copper with up to 5% by weight based on said salt of a liquid organic base, said contact taking place in a substantially non-aqueous system and under conditions of temperature and pressure such as to form an association product of said salt and said diolefine material, removing olefine material from said association product, and thereafter dissociating said association product in a manner to recover said diolefine material in more concentrated form.

11. A process for separating diolefine material in more concentrated form from a fluid hydrocarbon mixture containing said diolefine material and olefine material, which comprises contacting said mixture with a reagent comprising a finely divided intermixture of a solid powdered monovalent salt of copper with up to 5% by weight based on said salt of an organic amine, said contact taking place in a substantially non-aqueous system and under conditions of temperature and pressure such as to form an association product of said salt and said diolefine material, removing olefine material from said association product, and thereafter dissociating said association product in a manner to recover said diolefine material in more concentrated form.

12. A process for separating diolefine material in more concentrated form from a fluid hydrocarbon mixture containing said diolefine material and olefine material, which comprises contacting said mixture with a reagent comprising a finely divided intermixture of a solid powdered monovalent salt of copper with up to 5% by weight based on said salt of an alkyl amine, said contact taking place in a substantially non-aqueous system and under conditions of temperature and pressure such as to form an association product of said salt and said diolefine material, removing olefine material from said association product, and thereafter dissociating said association product in a manner to recover said diolefine material in more concentrated form.

13. A process for separating diolefine material in more concentrated form from a fluid hydrocarbon mixture containing said diolefine material and olefine material, which comprises contacting said mixture with a reagent comprising a finely divided intermixture of a solid powdered monovalent salt of copper with up to 5% by weight based on said salt of an hydroxy alkyl amine, said contact taking place in a substantially non-aqueous system and under conditions of temperature and pressure such as to form an association product of said salt and said diolefine material, removing olefine material from said association product, and thereafter dissociating said association product in a manner to recover said diolefine material in more concentrated form.

FREDERICK W. BREUER.